Dec. 22, 1942.  R. C. PEARSON  2,305,895
FLEXIBLE DRILL SAFETY GUARD
Filed June 23, 1941
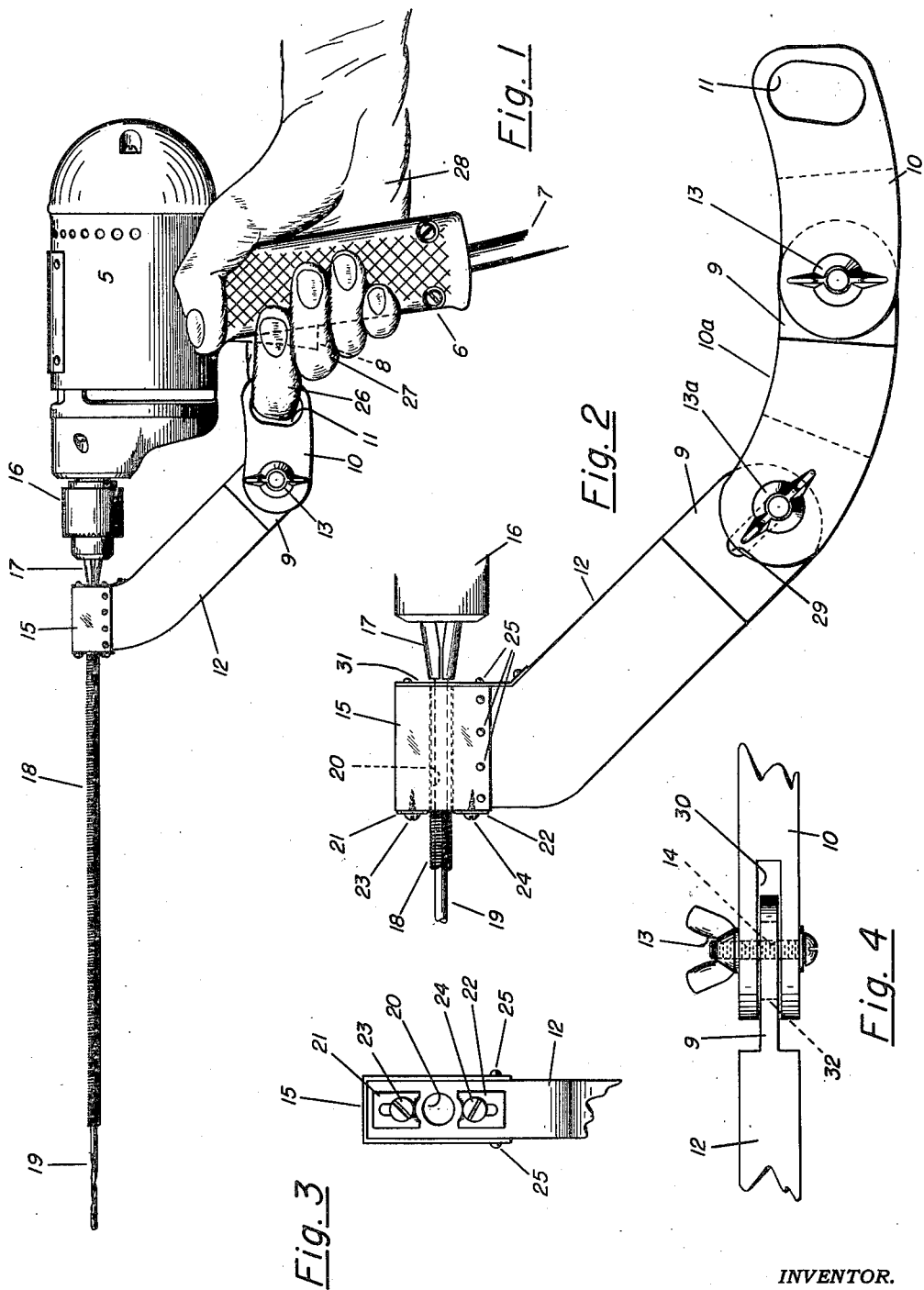
INVENTOR.
Raymond C. Pearson
BY Everett N. Curtis
ATTORNEY.

Patented Dec. 22, 1942

2,305,895

UNITED STATES PATENT OFFICE 2,305,895

FLEXIBLE DRILL SAFETY GUARD

Raymond C. Pearson, San Diego, Calif.

Application June 23, 1941, Serial No. 399,285

5 Claims. (Cl. 77—15)

My invention relates to flexible drill safety guards, and its objects are to safeguard the workman in using a flexible drill from injury from flying broken pieces occasioned in the breaking of the same during operation, to enable the workman to operate the flexible drill and connecting motor with one hand while leaving the other free to place upon the work or for such other use as may be desired; to utilize a guard for the shank of said drill which is sufficiently flexible to bend therewith and follow the movement thereof and at the same time may be easily installed or disassembled, and in other ways to simplify and render more effective to operation of the several parts. Other objects will appear as illustrated in the drawing and as hereinafter set forth and described.

In connection with the electric hand drill usually employed in airplane factories and other plants used for manufacture of metallic constructions, there is often used a bit of the shank of which is elongated to a considerable degree and which is made flexible so as to permit the workman to have access to out of way parts necessary to be drilled. Of necessity, such drill bit is made to rotate at such high speed that considerable strain is imposed thereon, and breakage at times is certain to result therefrom, so that jagged broken pieces will fly off with such velocity as to inflict severe wounds upon any part of the human body with which they may come in contact. At such times, the face of the workman, being in close proximity to the drill is likely to receive such wounds, and even the loss of eyesight may result. It is to guard against such injuries that my invention is primarily constructed, and for such purpose, I surround and cover the shank of the bit with a length of flexible tubing, and carefully secure the same in position, the shank of said bit revolving within the bore of said tubing and being prevented thereby from escaping therefrom in case of the breakage above described; the result being that the broken pieces are confined in place by the said tubing and the workman not in the least endangered thereby.

Attention is hereby directed to the drawing, illustrating a preferred form of my invention, in which similar numerals of designation refer to similar parts throughout the several views, and in which, Figure 1 is a side elevation of an electric hand drill to which is shown attached a flexible drill bit housed within a length of flexible tubing mounted upon a handle operated or controlled by the workman;

Fig. 2 is an enlarged view of the handle and adjacent parts shown in Fig. 1, with the addition of a removable extension giving greater length to said handle;

Fig. 3 is an end view of the housing and adjacent parts at the top of the handle shown in Fig. 1, with the drill bit and tubing removed, looking at the same from the left, and Fig. 4 is an enlarged plan view of the connection of the two parts of the handle.

Referring to the drawing, the electric hand drill 5 is of the usual form of construction, having the usual cable connection 7, and is provided with the grip 6, the chuck 16 and the chuck jaws 17, within which is shown installed and firmly gripped the end of the shank of the flexible drill bit 19. Surrounding the greater portion of the shank of said drill bit is the flexible tube 18, which is here shown in the form of a helix of wire, but which may be a tube of any material suitable for the purpose and of the required flexibility. Sufficient play should be permitted between its inner wall and the adjacent surface of the drill so as not to impede its rapid rotation within the bore of said tube, while at the same time following every bend of said drill while being used in the required position.

For the purpose of aiding the workman in the better control and operation of the said tube and drill, I preferably employ in connection with said tube, an auxiliary handle preferably constructed of two members 10 and 12, pivotally connected by the bolt 14; the tongue 9 of member 12 engaging with the slot 30 of member 10 and the thumb nut 13 engaging with the threaded end of said bolt 14 and serving to lock said members in operative position. If desired, a longitudinally extending slot 32 in said tongue 9 may be provided, the bolt 14 passing therethrough and permitting the members 10 and 12 to be moved further apart or closer together as occasion requires. Preferably the said members are made of wood, but may be of any suitable material. At the free end of member 10 is the opening 11, shaped to form a finger hold as shown, and through the head or upper portion of member 12 extends the opening 20 shaped to receive and hold the inner end of the flexible tube 18, such inner end being held firmly in position by the adjustable catch clips 21 and 22, secured by screws 23 and 24 to the upper and outer cheek of said head adjacent to the opening 20. To the inner cheek of said head is affixed, by means of screws 25, the plate or guard 31, having an opening through which extends the portion of the drill bit adjacent to the chuck jaws 17. Completely covering said head is the protective housing 15 secured thereto as shown by the screws or nails 25.

If for any reason, a greater length of handle is required, I provide in such cases the additional member 10a, which is constructed with a tongue 9, slot 30, bolt 14 and thumb nut 13, similar to those above described, and as shown as duly incorporated in the handle in Fig. 2 of the drawing. When so assembled, it will be noted that as shown in this assembly, the three members of the handle form an arcuate body extending through approximately ninety degrees; the top of the handle engaging the drill bit at substantially right angles thereto, and the lower part of such handle extending horizontally so as properly to present the finger hold 11 for ready engagement with the forefinger 26 of the human hand 28 grasping the grip 6.

In operating my invention, the grip 6 of the electric hand drill is firmly grasped by the hand of the workman, whose index finger 26 at the same time is inserted in the opening 11 of my improved handle, and whose middle finger 27 is in contact with the trigger 8 of said drill. The cutting end of the bit 19 is then brought into contact with the object to be drilled, the shank of such bit and flexible tubing surrounding the same being bent so far as is necessary for such purpose. Thereupon, through the thrusting forward or retrogression of the tube 18 on the shank of said bit by means of said index finger 26 acting upon the handle secured to said tube, the workman is able, upon pressing the trigger 8 and starting the operation of the flexible drill bit 19, to control the coverage of said bit at the points where breakage is likely to occur. Should such break take place, the workman by releasing pressure upon the trigger 8 will be able immediately to stop the operation of the drill, and the broken parts of the drill bit will be found all within the tube 18 without having been thrown off to the injury of such workmen, and a new drill bit may be readily installed to take the place of the broken drill.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In hand drilling apparatus, the combination of an electric hand drill, an elongated flexible drill bit affixed thereto and driven thereby, an elongated protective flexible tube mounted upon the shank of said drill bit and permitting said shank to revolve therein, and manual means connected with said tube and operating to move the same along the shank of said drill bit.

2. In hand drilling apparatus, the combination of an electric hand drill, an elongated flexible drill bit affixed thereto and driven thereby, an elongated flexible protective tube mounted upon the shank of said drill bit and permitting said shank to revolve therein, and a handle connected with said tube and operating to move the same longitudinally upon said shank.

3. In hand drilling apparatus, the combination of an electric hand drill, an elongated flexible drill bit affixed thereto and driven thereby, an elongated flexible protective tube mounted upon the shank of said drill bit and permitting said shank to revolve therein, and a handle, one end of which is attached to said tube and the other end of which extends at an angle to the other end and is provided with a finger hold for operating said handle to move said tube longitudinally upon said shank.

4. In hand drilling apparatus, the combination of an electric hand drill, an elongated flexible drill bit affixed thereto and driven thereby, and elongated flexible protective tube mounted upon the shank of said drill bit and permitting said shank to revolve therein, and a handle having two members pivotally connected, one of said members having a head enclosing the shank of said drill bit adjacent to the chuck of said motor and affixed to said tube, and the other of said members having a fingerhold for operating said handle so as to move said tube so attached to said head longitudinally upon the shank of said drill bit.

5. In hand drilling apparatus, the combination of an electric hand drill, an elongated drill bit affixed thereto and driven thereby, an elongated protective tube mounted upon the shank of said drill bit and permitting said shank to revolve therein, and manual means connected with said tube and operating to move the same along the shank of said drill bit.

RAYMOND C. PEARSON.